US012747353B2

(12) United States Patent
Gubbels et al.

(10) Patent No.: US 12,747,353 B2
(45) Date of Patent: Sep. 29, 2026

(54) SILICONE EMULSION AND USES THEREOF

(71) Applicant: DOW SILICONES CORPORATION, Midland, MI (US)

(72) Inventors: Frederic Gubbels, Seneffe (BE); Tatiana Dimitrova, Seneffe (BE)

(73) Assignee: DOW SILICONES CORPORATION, Midland, MI (US)

( * ) Notice: Subject to any disclaimer, the term of this patent is extended or adjusted under 35 U.S.C. 154(b) by 591 days.

(21) Appl. No.: 18/036,045

(22) PCT Filed: Nov. 16, 2021

(86) PCT No.: PCT/US2021/059445
§ 371 (c)(1),
(2) Date: May 9, 2023

(87) PCT Pub. No.: WO2022/108894
PCT Pub. Date: May 27, 2022

(65) Prior Publication Data

US 2023/0407092 A1 Dec. 21, 2023

Related U.S. Application Data

(60) Provisional application No. 63/114,725, filed on Nov. 17, 2020.

(51) Int. Cl.

| | |
|---|---|
| ***C08L 83/04*** | (2006.01) |
| ***C08G 77/08*** | (2006.01) |
| ***C08G 77/16*** | (2006.01) |
| ***C08G 77/18*** | (2006.01) |
| ***C08G 77/58*** | (2006.01) |
| ***C08K 5/5419*** | (2006.01) |

(52) U.S. Cl.
CPC .............. *C08L 83/04* (2013.01); *C08G 77/08* (2013.01); *C08G 77/16* (2013.01); *C08G 77/18* (2013.01); *C08G 77/58* (2013.01); *C08K 5/5419* (2013.01); *C08L 2201/52* (2013.01)

(58) Field of Classification Search
CPC ...... C08L 83/04; C08L 2201/52; C08L 83/14; C08L 83/00; C08G 77/08; C08G 77/16; C08G 77/18; C08G 77/58; C08G 77/398; C08G 77/38; C08K 5/5419; C09D 183/14; C09J 183/14; C09K 23/00
See application file for complete search history.

(56) References Cited

U.S. PATENT DOCUMENTS

| | | | |
|---|---|---|---|
| 4,985,476 | A | 1/1991 | Endres et al. |
| 5,551,997 | A | 9/1996 | Marder et al. |
| 5,614,654 | A | 3/1997 | Miyake et al. |
| 6,506,279 | B1 | 1/2003 | Luft et al. |
| 8,153,748 | B2 | 4/2012 | Katayama |
| 2010/0081751 | A1 | 4/2010 | Blanc-Magnard et al. |
| 2011/0207864 | A1 | 8/2011 | Nakamura et al. |
| 2011/0282086 | A1 | 11/2011 | Murakami et al. |
| 2019/0177486 | A1 | 6/2019 | Baily et al. |
| 2020/0115503 | A1 | 4/2020 | Langerbeins |
| 2021/0087396 | A1 | 3/2021 | Johnson et al. |

FOREIGN PATENT DOCUMENTS

| | | | | |
|---|---|---|---|---|
| CN | 102174259 A | 9/2011 | |
| EP | 2343341 A1 | 7/2011 | |
| EP | 2366741 A1 | 9/2011 | |
| JP | S4849889 A | 7/1973 | |
| JP | H08231728 A | 9/1996 | |
| JP | H09268383 A | 10/1997 | |
| JP | 2003160587 A | 6/2003 | |
| JP | 2003165841 A | 6/2003 | |
| WO | WO-2016120270 A1 * | 8/2016 | .......... H10W 74/476 |
| WO | 2018024858 A1 | 2/2018 | |
| WO | WO-2018024860 A1 * | 2/2018 | ............... A61Q 5/12 |
| WO | WO-2018024861 A1 * | 2/2018 | ............. C08G 77/16 |
| WO | 2018076337 A1 | 5/2018 | |
| WO | 2019027668 A1 | 2/2019 | |
| WO | 2019126014 A1 | 6/2019 | |

OTHER PUBLICATIONS

International Search Report for PCT/US2021/059445 dated Mar. 10, 2022, 4 pages.
International Search Report for PCT/US2021/059443 dated Mar. 10, 2022, 3 pages.
International Search Report for PCT/US2021/059447 dated Mar. 10, 2022, 3 pages.
Noll, W.; Chemistry and Technology of Silicones, Academic Press Inc., New York (1968), p. 397-399.
Brook, M. A.; Silicon in Organic, Organometallic and Polymer Chemistry, John Wiley & Sons, Inc. (2000), p. 285-287.

* cited by examiner

*Primary Examiner* — Doris L Lee
(74) *Attorney, Agent, or Firm* — Warner Norcross + Judd LLP

(57) ABSTRACT

Aqueous silicone emulsion compositions which cure utilising titanium-based reaction products as catalysts, and a process to prepare the same and their uses, are provided. The composition comprises (a) a titanium-based reaction product; (b) one or more silicon containing compounds having at least 2 or at least 3 hydroxyl and/or hydrolysable groups per molecule; (c) one or more surfactants; and (d) water. The titanium-based reaction product (a) is obtained or obtainable from a process comprising the steps of: (i) mixing a first ingredient, an alkoxy titanium compound having from 2 to 4 alkoxy groups with a second ingredient, a linear or branched polydiorganosiloxane having at least two terminal silanol groups per molecule and a viscosity of from 30 to 300,000 mPa·s at 25° C.; (ii) enabling the first and second ingredients to react together by stirring under vacuum to form a reaction product; and (iii) collecting the reaction product of step (ii).

18 Claims, No Drawings

SILICONE EMULSION AND USES THEREOF

CROSS-REFERENCE TO RELATED APPLICATIONS

This application is the U.S. National Stage of PCT/US2021/059445 filed on 16 Nov. 2021, which claims priority to and all advantages of U.S. Provisional Application No. 63/114,725 filed on 17 Nov. 2020, the content of which is incorporated herein by reference.

This disclosure relates to aqueous silicone emulsion compositions which cure utilising titanium-based reaction products as catalysts, a process to prepare same and their uses.

In many applications, including, for the sake of example, coating applications, pharmaceutical applications, beauty care applications such as hair care and skin care, and household care applications such as fabric care and foam control, it is often preferred and sometimes even necessary to provide and or deliver silicone products in the form of emulsions. Aqueous silicone emulsions may be prepared as curable/reactive compositions or alternatively as preformed elastomers resulting from the cure of components in said aqueous reactive silicone emulsions.

Emulsions are mixtures of immiscible liquids which appear homogeneous. One of the liquids is dispersed in the other in the form of droplets, which retain their integrity through the shelf life of the emulsion. Emulsifiers coat the droplets within an emulsion and prevent them from fusing together, or coalescing. Coalescence is a catastrophic event for emulsion stability leading to separation of the immiscible liquids.

In the case of reactive aqueous condensation cure silicone emulsion compositions, the use of one or more titanates as the catalyst in or as a curing agent is challenging since it necessitates the titanate being in direct contact with water, which can lead to a total deactivation of the catalyst during production or later during storage.

It is well known to those skilled in the art that alkoxy titanium compounds otherwise referred to as alkyl titanates, are suitable catalysts for moisture curable silicone compositions (References: Noll, W.; Chemistry and Technology of Silicones, Academic Press Inc., New York, 1968, p. 399, and Michael A. Brook, silicon in organic, organometallic and polymer chemistry, John Wiley & sons, Inc. (2000), p. 285). Titanate catalysts have been widely described for their use to cure silicone elastomers.

Until recently, aqueous reactive emulsions compositions generally have not used titanium-based catalysts in or as curing agents i.e. tetra alkyl titanates (e.g. $Ti(OR)_4$ where R is an alkyl group having at least one carbon) or chelated titanates, because it was well known that they are sensitive to hydrolysis (e.g. the cleavage of bonds in functional groups by reaction with water) or alcoholysis in the presence of water or alcohol respectively. In water the tetra alkyl titanates quickly react and liberate the alcohol corresponding to the alkoxy group bound to titanium. For example, in the presence of moisture tetra alkyl titanates can fully hydrolyse to form titanium (IV) hydroxide ($Ti(OH)_4$), which is of only limited solubility in silicone-based compositions. Crucially, the formation of titanium hydroxides such as titanium (IV) hydroxide can dramatically negatively affect their catalytic efficiency towards curable condensation curable silicone compositions, leading to uncured or at best only partially cured systems.

This issue is not seen with tin (IV) catalysts because they are not similarly affected by e.g., water. Hence, other curing agents such as tin or zinc-based catalysts, e.g., dibutyl tin dilaurate, tin octoate and/or zinc octoate are generally used (Noll, W.; Chemistry and Technology of Silicones, Academic Press Inc., New York, 1968, p. 397). Typically, when using titanite catalysts in or as curing agents, the condensation cure silicones reticulate (divide in such a way as to resemble a net or network) rather rapidly thus preventing efficient emulsification and the titanate catalysts are deactivated in presence of water due to their hydrolysis.

Recently contrary to historical expectations it has been found that in some instances titanium-based catalysts may be utilised in multi-part, e.g., aqueous reactive emulsions and/or two-part, compositions designed for condensation "bulk cure" of silicone-based compositions (e.g. WO2018024861 and WO2016120270). This is helpful to many users because tin cured condensation systems undergo reversion (i.e., depolymerisation) at temperatures above 80° C. and as such the use of tin (IV) catalysts are not desired for several applications especially where cured elastomers are going to be exposed to heat e.g., electronics applications. However, whilst this is a significant benefit, the titanium-based catalysts when used in said two-part compositions can't match the speed of cure obtained with tin (IV) catalysts.

The emulsification of (pre)cured elastomers is very difficult and may entail the application of very high shear. The modification process from hard elastic elastomers is very inefficient because the elasticity over the material causes the absorption of the energy supplied for emulsification and consequently prevents the rupture of the elastomeric material into droplets. It is therefore desirable to find an energy efficient, robust industrial process affording emulsion droplets made of elastomeric material or emulsion droplets which upon coalescence would produce an elastomer.

There is therefore a need to produce "soft" elastomers-in-water emulsion droplets which upon coalescence produce elastic films using standard condensation cure silicones compositions containing titanate catalysts by identifying a hydrolytically stable titanate which may be used in a curing agent formulation for reactive silicone emulsions and/or which can be used to reticulate/cross-link the elastomer either in the droplets (post-emulsification) or post coalescence to provide cured elastomeric silicone films from water-based matrixes.

There is provided herein an aqueous silicone emulsion composition comprising

- (a) a titanium-based reaction product obtained or obtainable from a process comprising the steps of:
  - (i) mixing a first ingredient, an alkoxy titanium compound having from 2 to 4 alkoxy groups with a second ingredient, a linear or branched polydiorganosiloxane having at least two terminal silanol groups per molecule and a viscosity of from 30 to 300 000 mPa·s at 25° C.;
  - (ii) enabling the first and second ingredients to react together by stirring under vacuum to form a reaction product; and
  - (iii) collecting the reaction product of step (ii);
- (b) one or more silicon containing compounds having at least 2, alternatively at least 3 hydroxyl and/or hydrolysable groups per molecule;
- (c) one or more surfactants;
- (d) water.

There is also provided herein a method for preparing an aqueous silicone emulsion composition comprising preparing a titanium-based reaction product (a) from a process comprising the steps of:

(i) mixing a first ingredient, an alkoxy titanium compound having from 2 to 4 alkoxy groups with a second ingredient, a linear or branched polydiorganosiloxane having at least two terminal silanol groups per molecule and a viscosity of from 30 to 300 000 mPa·s at 25° C.;

(ii) enabling the first and second ingredients to react together by stirring under vacuum to form a reaction product; and (iii) collecting the reaction product of step (ii); mixing the following components with reaction product (a) to form an emulsion:

(b) one or more silicon containing compounds having at least 2, alternatively at least 3 hydroxyl and/or hydrolysable groups per molecule;

(c) one or more surfactants;

(d) water.

There is also provided an elastomer which is the cured product of the above composition. Preferably the aforementioned aqueous silicone emulsion composition yields an elastomer upon the removal (e.g., evaporation) of water.

The emulsions herein are oil-in-water emulsions. The term "Oil-in-water" emulsion refers to the situation where a water insoluble liquid (oil) is dispersed in the form of droplets in continuous water phase.

It is to be appreciated that the component (a) reaction product not only appears to render the catalytic nature of the titanium molecules more hydrolytically stable (stable to water) but also, because the second ingredient generally has at least two Si—OH groups per molecule, the reaction product has Si—O—Ti or Si—OH groups available for reaction and as such component (a) participates in the curing process. Hence, when utilised in condensation curable silicone emulsion compositions, component (a), the reaction product functions both as a catalysts and as a cross-linkable oligomer/polymer.

Component (a) is a reaction product resulting from the reaction between a first ingredient, an alkoxy titanium compound having from 2 to 4 alkoxy groups and a second ingredient, a linear or branched polydiorganosiloxane having at least two terminal silanol groups per molecule and a viscosity of from 30 to 300 000 mPa·s at 25° C., as described herein. The first ingredient of the process described herein is an alkoxy titanium compound having from 2 to 4 alkoxy groups, e.g. $Ti(OR)_4$, $Ti(OR)_3R^1$, $Ti(OR)_2R^1{}_2$ or a chelated alkoxy titanium molecule where there are two alkoxy (OR) groups present and a chelate bound twice to the titanium atom; where R is a linear or branched alkyl group having from 1 to 20 carbons, alternatively 1 to 15 carbons, alternatively 1 to 10 carbons, alternatively 1 to 6 carbons and when present $R^1$ is an organic group such as an alkyl group having from 1 to 10 carbon atoms, an alkenyl group having from 2 to 10 carbon atoms, an alkynyl group having from 2 to 10 carbon atoms, a cycloalkyl group having from 3 to 10 carbon atoms, or a phenyl group having from 6 to 20 carbon atoms or a mixture thereof.

Each $R^1$ may contain optionally substituted groups with e.g., one or more halogen group such as chlorine or fluorine. Examples of $R^1$ may include but are not restricted to methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl) ethyl or chlorocyclohexyl group. However, typically each $R^1$ may be the same or different and may is selected from an alkyl group, an alkenyl group or an alkynyl group, alternatively an alkyl group, an alkenyl group, alternatively an alkyl group, in each case having up to 10 carbons, alternatively, up to 6 carbons per group.

As mentioned above R is a linear or branched alkyl group having from 1 to 20 carbons, include but are not restricted to methyl, ethyl, n-propyl, isopropyl, n-butyl, tertiary butyl and branched secondary alkyl groups such as 2, 4-dimethyl-3-pentyl. Suitable examples of first ingredient when $Ti(OR)_4$, include for the sake of example, tetra methyl titanate, tetra ethyl titanate, tetra n-propyl titanate, tetra n-butyl titanate, tetra t-butyl titanate and tetraisopropyl titanate. When first ingredient is $Ti(OR)_3R^1$, $R^1$ is typically an alkyl group and examples include but are not limited to trimethoxy alkyl titanium, triethoxy alkyl titanium, tri n-propoxy alkyl titanium, tri n-butoxy alkyl titanium, tri t-butoxy alkyl titanium and tri isopropoxy alkyl titanate.

The first ingredient i.e., the alkoxy titanium compound having from 2 to 4 alkoxy groups may be present in an amount of from 0.01 weight % (wt. %) to 20 wt. % of the total weight of [First ingredient+Second ingredient].

The second ingredient is a linear or branched polydiorganosiloxane having at least two terminal silanol groups per molecule and a viscosity of from 30 to 300 000 mPa·s at 25° C. The second ingredient may comprise an oligomer or polymer comprising multiple siloxane units of formula (1)

$$—(R^2{}_sSiO_{(4-s)/2})— \quad (1)$$

in which each $R^2$ is independently an organic group such as a hydrocarbyl group having from 1 to 10 carbon atoms optionally substituted with one or more halogen group such as chlorine or fluorine and s is 0, 1 or 2. In one alternative s is 2 and the linear or branched polydiorganosiloxane backbone is therefore linear although a small proportion of groups where s is 1 may be utilised to enable branching. For example, $R^2$ may include alkyl groups such as methyl, ethyl, propyl, butyl, alkenyl groups such as vinyl, propenyl, butenyl, pentenyl and or hexenyl groups, cycloalkyl groups such as cyclohexyl, and aromatic groups such as phenyl, tolyl group. In one alternative, $R^2$ may comprise alkyl groups, alkenyl groups and/or phenyl groups such as methyl, ethyl, propyl, butyl, alkenyl groups such as vinyl, propenyl, butenyl, pentenyl and or hexenyl groups, cycloalkyl groups such as cyclohexyl, and aromatic groups such as phenyl, tolyl group. Preferably, the polydiorganosiloxane chain is a polydialkylsiloxane chain, a polyalkylalkenylsiloxane chain or a polyalkylphenylsiloxane chain but co-polymers of any two or more of these may also be useful. When the second ingredient contains a polydialkylsiloxane chain, a polyalkylalkenylsiloxane chain and/or a polyalkylphenylsiloxane chain the alkyl groups usually comprises between 1 and 6 carbons; alternatively the alkyl groups are methyl and/or ethyl groups, alternatively the alkyl groups are methyl groups; the alkenyl groups usually comprises between 2 and 6 carbons; alternatively the alkenyl groups may be vinyl, propenyl, butenyl, pentenyl and or hexenyl groups, alternatively vinyl, propenyl, and/or hexenyl groups. In one alternative the polydiorganosiloxane is a polydimethylsiloxane chain, a polymethylvinylsiloxane chain or a polymethylphenylsiloxane chain, or a copolymer of two or all of these.

For the avoidance of doubt a polydiorganosiloxane polymer means a substance composed of a molecule of high molecular weight (generally having a number average molecular weight of greater than or equal to 10,000 g/mol comprising a large number of $—(R^2{}_sSiO_{(4-s)/2})—$ units which show polymer-like properties and the addition or removal of one or a few of the units has a negligible effect on the properties. In contrast a polydiorganosiloxane oligomer is a compound with a regular repeating structure —($R^2_sSiO_{(4-s/2)}$)— units having too low an average molecular weight e.g., a molecule consisting of a few monomer units, e.g., dimers, trimers, and tetramers are, for example, oligomers respectively composed of two, three, and four monomers.

When linear, each terminal group of the second ingredient must contain one silanol group. For example, the polydiorganosiloxane maybe dialkylsilanol terminated, alkyl disilanol terminated or trisilanol terminated but is preferably dialkylsilanol terminated. When branched the second ingredient must have at least two terminal Si—OH bonds per molecule and as such comprise at least two terminal groups which are dialkylsilanol groups, alkyl disilanol groups and/or trisilanol groups, but typically are dialkylsilanol groups.

Typically the second ingredient will have a viscosity in the order of 30 to 300 000 mPa·s, alternatively 70 to 100 000 mPa·s at 25° C. The viscosity may be measured using any suitable means e.g., a Modular Compact Rheometer (MCR) 302 from Anton Paar GmbH of Graz, Austria using the most suitable settings and plates for the viscosity concerned, for example using a 25 mm diameter rotational plate with a gap of 0.3 mm at a shear rate of 1 $s^{-1}$.

The number average molecular weight (Mn) and weight average molecular weight (Mw) of silicone can also be determined by Gel permeation chromatography (GPC) using polystyrene calibration standards. This technique is a standard technique, and yields values for Mw (weight average), Mn (number average) and polydispersity index (PI) (where PI=Mw/Mn).

Any Mn values provided in this application have been determined by GPC and represent a typical value of the polydiorganosiloxane used. If not provided by GPC, the Mn may also be obtained from calculation based on the dynamic viscosity of said polydiorganosiloxane.

The reaction as hereinbefore described may be undertaken at any suitable temperature but typically commences at room temperature but increases due to stirring during the reaction process.

The reaction takes place under vacuum with a view to removing at least 50 wt. %, alternatively at least 75 wt. % alternatively at least 90 wt. % of the total amount of alcoholic by-products generated during the reaction. The above may be determined via several analytical techniques of which the simplest is the determination of weight loss from the reaction product.

Without being tied to current understanding, it is believed that the main reaction products of the above reaction when the first ingredient is $Ti(OR)_4$, is a mixture of $$(RO)_nTi((OSiR^2{}_2)_m\text{—}OH)_{4-n} \tag{2}$$

Where n is 0, 1 or 2, alternatively 0 or 1, but preferably the major product is where n is 0, i.e.

$$Ti((OSiR^2{}_2)_m\text{—}OH)_4 \tag{3}$$

Where m is the degree of polymerisation of the second ingredient and is an integer indicative (commensurate) of the viscosity of the second ingredient.

Similarly when the first ingredient is substantially $Ti(OR)_3R^1$ it is believed that the main reaction products of the above reaction where a is 0 or 1, is $$R^1(RO)_aTi((OSiR^2{}_2)_m\text{—}OH)_{3-a} \tag{4}$$

but preferably the major product is where a is 0, i.e.

$$R^1Ti((OSiR^2{}_2)_m\text{—}OH)_3 \tag{5}$$

Where m is an integer indicative (commensurate) of the viscosity of the second ingredient.

Optionally, there may be a third ingredient present. When present, the third ingredient is a linear or branched polydiorganosiloxane and may be an oligomer or polymer as described for the second ingredient but having one terminal silanol group per molecule for use in the reaction described above to form a Si—O—Ti bond with the first ingredient but also comprising at least one terminal group containing no silanol groups. The terminal groups containing no silanol groups may comprise three $R^2$ groups as defined above, alternatively a mixture of alkyl and alkenyl $R^2$ groups, alternatively alkyl $R^2$ groups. Examples include trialkyl termination e.g., trimethyl or triethyl termination or dialkylalkenyl termination, e.g., dimethylvinyl or diethyl vinyl or methylethylvinyl termination or the like.

Typically the third ingredient will also have a viscosity in the order of 30 to 300 000 mPa·s, alternatively 70 to 100 000 mPa·s at 25° C. The viscosity may be measured using any suitable means e.g., a Modular Compact Rheometer (MCR) 302 from Anton Paar GmbH of Graz, Austria using the most suitable settings and plates for the viscosity concerned, for example using a 25 mm diameter rotational plate with a gap of 0.3 mm at a shear rate of is-'.

The third ingredient may be present in an amount of up to 75 wt. % of the combination of the weight of the first, second and third ingredients, whereby the third ingredient replaces the equivalent proportion of the second ingredient. However, preferably the third ingredient, when present, is present in an amount of no more than 50 wt. %, alternatively no more than 25 wt. % of the weight of the first, second and third ingredients. When the third ingredient is present one or more —OH groups in structures (2), (3), (4) or (5) may be replaced by an $R^2$ group, alternatively an alkyl group or an alkenyl group, alternatively an alkyl group. For example, in the case of structure (2) the reaction product may be that shown below in structure (2a):

$$(RO)_nTi((OSiR^2{}_2)_m\text{—}R^2)_p((OSiR^2{}_2)_m\text{—}OH)_{4-n-p} \tag{2a}$$

Where n is 0, 1 or 2, alternatively 0 or 1, p is 0, 1 or 2, alternatively 0 or 1, and n+p is less than or equal to 4 and m is as defined above.

It is preferred not to include the third ingredient as a reactant in the process as when titanium-based reaction products of the type depicted in structures (2), (3), (4) or (5) are present, the terminal silanol groups are potentially available for participation in the formation of the cured silicone network, which makes them useful in the fully formulated elastomers. This is clearly less likely to be the case when a greater amount of the third ingredient is used as a starting ingredient in the process to make titanium-based reaction products provided as component (a) herein. However, the presence of some third ingredient starting materials may be useful to assist in obtaining the required modulus of elastomers cured using the product of the process described herein.

When the starting ingredients in the process used for the preparation of component (a) of the composition herein are the first and second ingredients, the molar ratio of silanol groups:titanium may be any suitable ratio equal to or greater than 2:1. However, it is preferred for the ratio to be within the range of from 5:1 to 15:1 alternatively from 7:1 to 15:1, alternatively from at least 8:1 to 11:1. Lower ratios seem to lead to the presence of more viscous reaction product and less first ingredient present results in slower gelling times.

The molar amount of any starting ingredient was determined using the following calculation:

[Weight in parts of the ingredient×100]/[sum of all parts of the starting ingredients×MW of the ingredient]

Hence, merely for example, when ingredient 1 is tetra n-butyl titanate (TnBT), if ingredient 1 and ingredient 2 were mixed in a weight ratio of 10:1, i.e., 10 parts of ingredient 2 to every one part by weight of ingredient 1, given the molecular weight of TnBT is 340; the calculation would be:—.

[Weight in Parts of TnBT (1)×100]/[sum of all parts of the starting ingredients (11)×340]=0.0267 mole of catalyst per 100 g of the composition.

In an alternative embodiment, the second ingredient may be introduced into the first ingredient. This embodiment is less convenient than the above because titanates of the type used as the first ingredient, from which volatile alcohols (R—OH) are generated in accordance with chemical reaction (6) below, are generally flammable due to the moisture from environment because it will substantially always contain some alcohol residues. The flash point of the titanium catalyst depends on the alcohol flammability.

Ti—OR+$H_2O$ (moisture from the air)→Ti—OH+R—OH

Ti—OR+Si—OH→Ti—O—Si+R—OH (6)

Hence, this method will require an explosion proof manufacturing process and the second ingredient must be introduced into the first ingredient in a gradual measured manner. This route is likely to lead, at least initially, to a more concentrated catalyst until gradually the content of the second ingredient is increased. This embodiment is also less favoured because it is more difficult to remove the alcoholic by-products as successfully and the content of the second ingredient is generally much larger than the first ingredient in weight and volume.

It was found however that there was no need for complicated separation techniques to be used to isolate specific titanium species as the reaction product works very well without separation as a catalyst in or as a curing agent for condensation curable two-part silicone elastomer compositions.

Component (a) is typically present in the oil-phase of the final emulsion composition in an amount of from 5 wt. % to 95 wt. % alternatively 10 wt. % to 95 wt. % alternatively from 15 to 80% wt. % and alternatively from 20 wt. % to 70 wt. % of the oil-phase of the emulsion composition.

Component (b) of the aqueous silicone emulsion composition is one or more silicon containing compounds having at least 2, alternatively at least 3 hydroxyl and/or hydrolysable groups per molecule. Component (b) is effectively functioning as a cross-linker and as such requires a minimum of 2 hydrolysable groups per molecule and preferably 3 or more. In some instances, component (b) may be considered as a chain extender, i.e., when reaction product (a) only has one or two reactive groups, but can be used as a cross-linker if reaction product (a) has 3 or more reactive groups per molecule which in this instance is typically anticipated to be the norm.

Component (b) may thus have two but alternatively has three or more silicon-bonded condensable (preferably hydroxyl and/or hydrolysable) groups per molecule which are reactive with the silanol groups in the component (a) reaction product.

In one embodiment, component (b) of the composition herein is a polyorganosiloxane polymer having at least two hydroxyl or hydrolysable groups per molecule e.g., of the formula $$X_{3-n'}R^3_{n'}Si—(Z)_d(O)_q—(R^4_ySiO_{(4-y)/2})_z—(SiR^4_2—Z)_d—Si—R^3_{n'}X_{3-n'} \quad (7)$$

in which each X is independently a hydroxyl group or a hydrolysable group, each $R^3$ is an alkyl, alkenyl or aryl group, each $R^4$ is X group, alkyl group, alkenyl group or aryl group and Z is a divalent organic group;

d is 0 or 1, q is 0 or 1 and d+q=1; n' is 0, 1, 2 or 3, y is 0, 1 or 2, and preferentially 2 and z is an integer commensurate with the viscosity of said polyorganosiloxane polymer.

Component (b), when a polyorganosiloxane polymer, has a viscosity of from 50 to 150,000 mPa·s at 25° C., alternatively from 10,000 to 80,000 mPa·s at 25° C., alternatively from 40,000 to at 25° C., The viscosity may be measured using any suitable means e.g. a Modular Compact Rheometer (MCR) 302 from Anton Paar GmbH of Graz, Austria using the most suitable settings and plates for the viscosity concerned, for example using a 25 mm diameter rotational plate with a gap of 0.3 mm at a shear rate of 1 $s^{-1}$. The value of z is therefore an integer enabling (commensurate with) such a viscosity, alternatively z is an integer from 100 to 5000, alternatively from 300 to 2000, alternatively from 500 to 1500. Whilst y is 0, 1 or 2, substantially y=2, e.g., at least 90% alternatively 95% of $(R^4_ySiO_{(4-y)/2})_z$ groups are characterized with y=2. Component (b) is present in the oil-phase of the final emulsion composition in an amount of from 10 to 90 wt. %, alternatively 15 to 85 wt. %, alternatively 10-80 wt. %, alternatively 15 to 65 wt. %, alternatively from to 65 wt. % from of the oil-phase of the final emulsion composition. In cases where the emulsion is stored in two parts the part containing component (b) will typically comprise between 40 and 90 wt. % of the emulsion comprising component (b).

Each X group of component (b), when a polyorganosiloxane polymer may be the same or different and can be a hydroxyl group or a condensable or hydrolyzable group. The term "hydrolyzable group" means any group attached to the silicon which is hydrolyzed by water at room temperature. The hydrolyzable group X includes groups of the formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —$(CH_2CH_2O)_2CH_3$.

The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy. When d=1, n' is typically 0 or 1 and each X is an alkoxy group, alternatively an alkoxy group having from 1 to 3 carbons, alternatively a methoxy or ethoxy group. In such a case component (b) when a polyorganosiloxane polymer has the following structure:

$$X_{3-n'}R^3_{n'}Si—(Z)—(R^4_ySiO_{(4-y)/2})_z—(SiR^4_2—Z)—Si—R^3_{n'}X_{3-n'}$$

with $R^3$, $R^4$, Z, y and z being the same as previously identified above, n' being 0 or 1 and each X being an alkoxy group.

Each $R^3$ is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, substituted aliphatic organic groups such as 3,3,3-trifluoropropyl groups aminoalkyl groups, polyaminoalkyl groups, and/or epoxyalkyl groups.

Each $R^4$ is individually selected from the group consisting of X or $R^3$ with the proviso that cumulatively at least two X groups and/or $R^4$ groups per molecule are hydroxyl or hydrolysable groups. It is possible that some $R^4$ groups may be siloxane branches off the polymer backbone which branches may have terminal groups as hereinbefore described. Most preferred $R^4$ is methyl.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms. Each alkylene group may for example be individually selected from an ethylene, propylene, butylene, pentylene and/or hexylene group.

Additionally n' is 0, 1, 2 or 3, d is 0 or 1, q is 0 or 1 and d+q=1. In one alternatively when q is 1, n' is 1 or 2 and each X is an OH group or an alkoxy group. In another alternative when d is 1 n' is 0 or 1 and each X is an alkoxy group.

Component (b), when a polyorganosiloxane polymer, can be a single siloxane represented by Formula (7) or it can be mixtures of polyorganosiloxane polymers represented by the aforesaid formula. Hence, the term "siloxane polymer mixture" in respect to Component (b) is meant to include any individual Component (b) or mixtures of polyorganosiloxane polymers.

The Degree of Polymerization (DP), (i.e., in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) using polystyrene calibration standards with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity.

In an alternative embodiment component (b) may be:

silanes having at least 2 hydrolysable groups, alternatively at least 3 hydrolysable groups per molecule group; and/or silyl functional molecules having at least 2 silyl groups, each silyl group containing at least one hydrolysable group.

For the sake of the disclosure herein silyl functional molecule is a silyl functional molecule containing two or more silyl groups, each silyl group containing at least one hydrolysable group. Hence, a disilyl functional molecule comprises two silicon atoms each having at least one hydrolysable group, where the silicon atoms are separated by an organic chain or a siloxane chain not described above. Typically, the silyl groups on the disilyl functional molecule may be terminal groups. The spacer may be a polymeric chain.

The hydrolysable groups on the silyl groups include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). In some instances, the hydrolysable group may include hydroxyl groups.

The silane component (b) may include alkoxy functional silanes, oximosilanes, acetoxy silanes, acetonoxime silanes and/or enoxy silanes.

When the crosslinker is a silane and when the silane has only three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. The fourth silicon-bonded organic groups may be methyl.

A typical silane may be described by formula (8)

$$R''_{4-r}Si(OR^5)_r \qquad (8)$$

wherein $R^5$ is described above and r has a value of 2, 3 or 4. Typical silanes are those wherein R" represents methyl, ethyl or vinyl or isobutyl. R" is an organic radical selected from linear and branched alkyls, allyls, phenyl and substituted phenyls, acetoxy, oxime. In some instances, $R^5$ represents methyl or ethyl and r is 3.

Another type of suitable component (b) are molecules of the type $Si(OR^5)_4$ where $R^5$ is as described above, alternatively propyl, ethyl or methyl. Partial condensates of $Si(OR^5)_4$ may also be considered.

In one embodiment component (b) is a silyl functional molecule having at least 2 silyl groups each having at least 1 and up to 3 hydrolysable groups, alternatively each silyl group has at least 2 hydrolysable groups.

Component (b) may be a disilyl functional polymer, that is, a polymer containing two silyl groups, each containing at least one hydrolysable group such as described by the formula (4)

$$(R^6O)_{m'}(Y^1)_{3-m'}—Si(CH_2)_x—((NHCH_2CH_2)_t-Q(CH_2)_x)_{n''}—Si(OR^6)_{m'}(Y^1)_{3-m'} \qquad (4)$$

where $R^6$ is a $C_{1-10}$ alkyl group, $Y^1$ is an alkyl groups containing from 1 to 8 carbons, Q is a chemical group containing a heteroatom with a lone pair of electrons e.g., an amine, N-alkylamine or urea; each x is an integer of from 1 to 6, t is 0 or 1; each m' is independently 1, 2 or 3 and n" is 0 or 1.

The silyl (e.g., disilyl) functional component (b) may have a siloxane or organic polymeric backbone. Suitable polymeric component (b) may have a similar polymeric backbone chemical structure to the siloxanes identified as ingredient (ii) of component (a) and/or component (b). Alternatively, the polymeric backbone of a silyl (e.g., disilyl) functional component (b) may be organic, i.e., component (b) may alternatively be organic based polymers with silyl terminal groups e.g., silyl polyethers, silyl acrylates and silyl terminated polyisobutylenes. In the case of silyl polyethers the polymer chain is based on polyoxyalkylene based units. Such polyoxyalkylene units preferably comprise a linear predominantly oxyalkylene polymer comprised of recurring oxyalkylene units, $(—C_{n'''}H_{2n'''}—O—)$ illustrated by the average formula $(—C_{n'''}H_{2n'''}—O—)$, wherein n''' is an integer from 2 to 4 inclusive and y is an integer of at least four. Likewise, the viscosity will be <1000 at 25° C. mPa·s, alternatively 250 to 1000 mPa·s at 25° C. alternatively 250 to 750 mPa·s at 25° C. and will have a suitable number average molecular weight of each polyoxyalkylene polymer block present. The viscosity may be measured using any suitable means e.g., a Modular Compact Rheometer (MCR) 302 from Anton Paar GmbH of Graz, Austria using the most suitable settings and plates for the viscosity concerned, for example using a 25 mm diameter rotational plate with a gap of 0.3 mm at a shear rate of 1 $s^{-1}$. Moreover, the oxyalkylene units are not necessarily identical throughout the polyoxyalkylene monomer but can differ from unit to unit. A polyoxyalkylene block or polymer, for example, can be comprised of oxyethylene units, $(—C_2H_4—O—)$; oxypropylene units $(—C_3H_6—O—)$; or oxybutylene units, $(—C_4H_8—O—)$; or mixtures thereof.

Other polyoxyalkylene units may include for example: units of the structure $$—[—R^e—O—(—R^f—O—)_w\text{-Pn-}CR^g_2\text{-Pn-O}—(—R^f—O—)_q—R^e]—$$

in which Pn is a 1,4-phenylene group, each $R^e$ is the same or different and is a divalent hydrocarbon group having 2 to 8 carbon atoms, each R f is the same or different and, is, an ethylene group or propylene group, each $R^g$ is the same or different and is, a hydrogen atom or methyl group and each of the subscripts w and q is a positive integer in the range from 3 to 30.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

In the case of such siloxane or organic based cross-linkers the molecular structure can be straight chained, branched, cyclic or macromolecular, i.e., a silicone or organic polymer chain bearing alkoxy functional end groups include polydimethylsiloxanes having at least one trialkoxy terminal where the alkoxy group may be a methoxy or ethoxy group.

In the case of siloxane-based polymers the viscosity of the cross-linker will be within the range of from about 10 mPa·s to 80,000 mPa·s at 25° C. The viscosity may be measured using any suitable means e.g., a Modular Compact Rheometer (MCR) 302 from Anton Paar GmbH of Graz, Austria using the most suitable settings and plates for the viscosity concerned, for example using a 25 mm diameter rotational plate with a gap of 0.3 mm at a shear rate of 1 $s^{-1}$.

Whilst any of the hydrolysable groups mentioned above are suitable it is preferred that the hydrolysable groups are alkoxy groups and as such the terminal silyl groups may have the formula such as $—R^aSi(OR^b)_2$, $—Si(OR^b)_3$, $—R^a_2SiOR^b$ or $—(R^a)_2Si—R^c—SiR^d_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl group having up to 6 carbon atoms; $R^c$ is a divalent hydrocarbon group which may be interrupted by one or more siloxane spacers having up to six silicon atoms; and p has the value 0, 1 or 2. Typically each terminal silyl group will have 2 or 3 alkoxy groups.

Component (b) thus include alkyltrialkoxysilanes such as methyltrimethoxysilane (MTM) and methyltriethoxysilane, tetraethoxysilane, partially condensed tetraethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris (isopropenoxy)silane, ethylpolysilicate, n-propylorthosilicate, ethylorthosilicate, dimethyltetraacetoxydisiloxane, oximosilanes, acetoxy silanes, acetonoxime silanes, enoxy silanes and other such trifunctional alkoxysilanes as well as partial hydrolytic condensation products thereof; 1,6-bis(trimethoxysilyl)hexane (alternatively known as hexamethoxydisilylhexane), bis(trialkoxysilylalkyl)amines, bis (dialkoxyalkylsilylalkyl)amine, bis (trialkoxysilylalkyl)N-alkylamine, bis (dialkoxyalkylsilylalkyl) N-alkylamine, bis (trialkoxysilylalkyl)urea, bis (dialkoxyalkylsilylalkyl) urea, bis (3-trimethoxysilylpropyl) amine, bis (3-triethoxysilylpropyl)amine, bis (4-trimethoxysilylbutyl)amine, bis (4-triethoxysilylbutyl) amine, bis (3-trimethoxysilylpropyl)N-methylamine, bis (3-triethoxysilylpropyl)N-methylamine, bis (4-trimethoxysilylbutyl)N-methylamine, bis (4-triethoxysilylbutyl)N-methylamine, bis (3-trimethoxysilylpropyl)urea, bis (3-triethoxysilylpropyl)urea, bis (4-trimethoxysilylbutyl)urea, bis (4-triethoxysilylbutyl)urea, bis (3-dimethoxymethylsilylpropyl)amine, bis (3-diethoxymethyl silylpropyl)amine, bis (4-dimethoxymethylsilylbutyl)amine, bis (4-diethoxymethyl silylbutyl)amine, bis (3-dimethoxymethylsilylpropyl) N-methylamine, bis (3-diethoxymethyl silylpropyl)N-methylamine, bis (4-dimethoxymethylsilylbutyl)N-methylamine, bis (4-diethoxymethyl silylbutyl) N-methylamine, bis (3-dimethoxymethylsilylpropyl)urea, bis (3-diethoxymethyl silylpropyl)urea, bis (4-dimethoxymethylsilylbutyl)urea, bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine, bis (4-diethoxyethyl silylbutyl)amine, bis (3-dimethoxyethylsilylpropyl)N-methylamine, bis (3-diethoxyethyl silylpropyl)N-methylamine, bis (4-dimethoxyethylsilylbutyl)N-methylamine, bis (4-diethoxyethyl silylbutyl)N-methylamine, bis (3-dimethoxyethylsilylpropyl)urea bis (3-diethoxyethyl silylpropyl)urea, bis (4-dimethoxyethylsilylbutyl)urea and/or bis (4-diethoxyethyl silylbutyl)urea; bis (triethoxysilylpropyl)amine, bis (trimethoxysilylpropyl)amine, bis (trimethoxysilylpropyl) urea, bis (triethoxysilylpropyl)urea, bis (diethoxymethylsilylpropyl)N-methylamine; di or trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; di or triacetoxy silyl terminated polydialkyl; polyarylalkyl siloxane; di or trioximino silyl terminated polydialkyl; polyarylalkyl siloxane; di or triacetonoxy terminated polydialkyl or polyarylalkyl. The component (b) used may also comprise any combination of two or more of the above.

Preferably component (b) is titanium free. Preferably component (b) of the composition herein is a polyorganosiloxane polymer having at least two hydroxyl or hydrolysable groups per molecule, especially of the type depicted in formula (7) above.

Component (c) of the aqueous silicone emulsion composition herein is one or more surfactants. Surfactants are amphiphilic organic compounds, which contain both hydrophobic groups (referred to as tails) which tend to be insoluble in water and hydrophilic groups. (referred to as heads) which tend to be water soluble. They reduce the surface tension of a liquid by adsorbing at the liquid/gas interface or liquid/liquid interface in case of immiscible liquids and may alternatively be referred to as emulsifiers, emulgents, or tensides, e.g., a surfactant is frequently referred to as an emulsifier when used to stabilize emulsions. Surfactants are classified depending on the nature of the heads (e.g., captioning, non-ionic, anionic and amphoteric) and component (c) herein may be an anionic surfactant, cationic surfactant, non-ionic surfactant, amphoteric surfactant, or a mixture thereof.

Examples of anionic surfactants include but are not restricted to alkali metal, amine, or ammonium salts of higher fatty acids, alkylaryl sulphonates such as sodium dodecyl benzene sulfonate, fatty alcohol sulfates, sulfates of ethoxylated fatty alcohols, olefin sulfates, olefin sulfonates, sulphated monoglycerides, sulfated esters, sulfonated ethoxylated alcohols, sulfosuccinates, phosphate esters, alkyl sarcosinates, alkyl ester sulfonates of alkali metals as for example dioctyl sodium sulfosuccinate, alkyl glyceryl sulfonates, fatty acid glycerol ester sulfonates, acyl methyl taurates, alkylsuccinic acids, alkenylsuccinic acids and corresponding esters, alkylsulfosuccinic acids and corresponding amides, mono- and di-esters of sulfosuccinic acids, acyl sarcosinates, sulfated alkyl polyglucosides, alkyl polyglycol carboxylates, hydroxyalkyl sarcosinates and mixtures thereof.

Examples of cationic surfactants include alkylamine salts, quaternary ammonium salts such as hexadecyl-trimethylammonium chloride; sulphonium salts, and phosphonium salts such as tributyltetradecyl-phosphonium chloride).

Examples of amphoteric surfactants include imidazoline compounds, alkylamino acid salts, betaines, and mixtures thereof.

Examples of non-ionic surfactants include polyoxyethylene fatty alcohols such as polyoxyethylene (23) lauryl ether, polyoxyethylene (4) lauryl ether; ethoxylated alcohols such as ethoxylated trimethylnonanol, C12-C14 secondary alcohol ethoxylates, ethoxylated, C10-Guerbet alcohol, ethoxylated, iso-C13 alcohol; poly(oxyethylene)-poly(oxypropylene)-poly(oxyethylene) tri-block copolymer (also referred to as poloxamers); tetrafunctional poly(oxyethylene)-poly (oxypropylene) block copolymer derived from the sequential addition of propylene oxide and ethylene oxide to ethylene diamine (also referred to as poloxamines), silicone polyethers, and mixtures thereof.

Typically, the surfactant is present in the oil-phase of the emulsion composition in an amount of from 0.1 to 10 wt. %, alternatively from 0.5 to 8 wt. %, alternatively from 1 to 5 wt. % based on the total weight of the oil-phase of the emulsion composition.

Component (d) is water. Water may include molecular water ($H_2O$) such as tap water, well water, purified water, deionized water, and combinations thereof. In one embodiment, the water of the emulsion consists essentially of molecular water and does not include any other diluents such as organic compounds, acids, etc. In another embodiment, the water of the emulsion composition consists of molecular water, such as purified water. Of course, it is to be understood that the purified water may still contain trace impurities. The water used in the emulsification step herein was softened and demineralized.

Typically, water is present in the emulsion in an amount of from 5 to 95 wt. %, alternatively from 20 to 80 wt. %, alternatively from 10 to 45 wt. % based on the total weight of based on the total weight of the emulsion.

The aqueous silicone emulsion composition as hereinbefore described may also include additives. The additives will depend on the intended end use of the emulsion composition but may include, but are not limited to, fillers, thickeners, preservatives and biocides, pH controlling agents, adhesion promoters, (inorganic) salts, dyes, perfumes, and mixtures thereof.

The additive may be present in either the continuous water phase or a dispersed phase of the emulsion composition in any amount selected by one of skill in the art. In various embodiments, the additive is typically present in amounts of from about 0.0001 to about 25 wt. %, alternatively from about 0.001 to about 10 wt. %, alternatively about 0.01 to about 3% based on the total weight of the emulsion.

The aqueous silicone emulsion composition may include a thickener to increase the viscosity of the emulsion composition at low shear rates while maintaining flow properties of the emulsion composition at higher shear rates. Suitable thickeners include, but are not limited to, polyalkylene oxides such as polyethylene oxide, polypropylene oxide, polybutylene oxide, and combinations thereof, acrylamide polymers and copolymers, acrylate copolymers and salts thereof, such as sodium polyacrylate; natural and synthetic polysaccharides cellulose, alginate, starch, gum and their derivatives. Non limiting examples include methylcellulose, methylhydroxypropylcellulose, hydroxypropylcellulose, polypropylhydroxyethylcellulose sodium alginate, Arabic-, xanthan-, cassia-, guar-gums and their derivatives, clays, for example hectorite or Laponite™ commercially available from Eckhart and their derivatives and mixtures thereof. When present, the thickener may be combined with the water or the "oil" before the emulsion is formed. Typically, the thickener is combined with the water before the emulsion is formed. When present, the thickener is typically present in an amount of from 0.001 to 6 wt. %, alternatively from 0.05 to 3, alternatively from 0.1 to 3% based on the total weight of the emulsion.

The aqueous silicone emulsion composition may include one or more fillers. When present, the filler maybe one or more reinforcing fillers or non-reinforcing fillers. In the case of reinforcing fillers these may be for the sake of example precipitated calcium carbonate, ground calcium carbonate, fumed silica, colloidal silica and/or precipitated silica. Typically, the surface area of reinforcing filler is at least 15 $m^2/g$ in the case of precipitated calcium carbonate measured in accordance with the BET method in accordance with ISO 9277: 2010, alternatively 15 to 50 $m^2/g$, alternatively, 15 to 25 $m^2/g$. Silica reinforcing fillers have a typical surface area of at least 50 $m^2/g$. The silica filler may be precipitated silica and/or fumed silica. In the case of high surface area fumed silica and/or high surface area precipitated silica, these may have surface areas of from 75 to 450 $m^2/g$ measured using the BET method in accordance with ISO 9277: 2010, alternatively of from 100 to 400 $m^2/g$ using the BET method in accordance with ISO 9277: 2010.

Typically, the fillers are present in the composition in an amount of from about 5 to 45 wt. % of the composition, alternatively from about 5 to 30 wt. % of the composition, alternatively from about 5 to 25 wt. % of the composition, depending on the chosen filler.

The reinforcing filler may be hydrophobically treated, for example, with one or more aliphatic acids, e.g. a fatty acid such as stearic acid or a fatty acid ester such as a stearate, or with organosilanes, organosiloxanes, or organosilazanes hexaalkyl disilazane or short chain siloxane diols to render the reinforcing filler(s) hydrophobic and therefore easier to handle and obtain a homogeneous mixture with the other adhesive components. The surface treatment of the fillers makes them easily wetted by components (a) and (b). These surface modified fillers do not clump and can be homogeneously incorporated into the components (a). This results in improved room temperature mechanical properties of the uncured compositions. The fillers may be pre-treated or may be treated in situ when being mixed with component (a) and/or (b).

Examples of pH controlling agents include any water-soluble acid or base or soluble salts. Examples include, but are not limited to, acids include carboxylic acid, hydrochloric acid, sulphuric acid, and phosphoric acid, monocarboxylic acids such as acetic acid and lactic acid, and polycarboxylic acids such as succinic acid, adipic acid, citric acid, and mixtures thereof. Examples include, but are not limited to, bases such as sodium hydroxide, ammonia etc. Examples include, but are not limited to, salts such as alkali carbonates, alkali hydrogen-carbonates, alkali phosphates, alkali hydrogen-phosphates and mixtures thereof.

For the purpose of the present invention "preservatives and biocides" are materials which prevent and or suppress the microbial growth, regardless of its type (e.g., fungi, bacteria, mildew and the like). Examples of preservatives and biocides include paraben derivatives, hydantoin derivatives, chlorhexidine and its derivatives, imidazolidinyl urea, phenoxyethanol, silver derivatives, salicylate derivatives, triclosan, ciclopirox olamine, hexamidine, oxyquinoline and its derivatives, PVP-iodine, zinc salts and derivatives such as zinc pyrithione, glutaraldehyde, formaldehyde, 2-bromo-2-nitropropane-1,3-diol, 5-chloro-2-methyl-4-isothiazoline-3-one, 2-methyl-4-isothiazoline-3-one, phenoxyethanol, benzalkonium chloride, and mixtures thereof.

Optionally component (a) and/or component (b) when a polyorganosiloxane polymer may be prepared in the presence of a diluent. Examples of diluents include silicon containing diluents such as hexamethyldisiloxane, octamethyltrisiloxane, and other short chain linear siloxanes such as octamethyltrisiloxane, decamethyltetrasiloxane, dodecamethylpentasiloxane, tetradecamethylhexasiloxane, hexadeamethylheptasiloxane, heptamethyl-3-1(trimethylsilyfloxy)ltrisiloxane, cyclic siloxanes such as hexamethylcyclotrisiloxane, octamethylcyclotetrasiloxane, decamethylcyclopentasiloxane, dodecamethylcyclohexasiloxane; organic diluents such as butyl acetate, alkanes, alcohols, ketones, esters, ethers, glycols, glycol ethers, hydrocarbons, hydrofluorocarbons or any other material which can dilute the composition without adversely affecting any of the component materials. The diluent might be a mixture of two or more diluents. Hydrocarbons include isododecane, isohexadecane, Isopar L (C11-C 13), Isopar H(C11-C12), hydrogenated polydecene, mineral oil, especially hydrogenated mineral oil or white oil, liquid polyisobutene, isoparaffinic oil or petroleum jelly. Ethers and esters include isodecyl neopentanoate, neopentylglycol heptanoate, glycol distearate, dicaprylyl carbonate, diethylhexyl carbonate, propylene glycol n butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, and octyl palmitate. Additional organic diluents include fats, oils, fatty acids, and fatty alcohols. A mixture of diluents may also be used.

If the emulsion composition is adapted for use as a beauty care composition such as a cosmetic composition or a hair care composition, the emulsion composition will incorporate at least one appropriate Cosmetic ingredient.

If the emulsion composition is adapted for use in a health care composition the emulsion composition will incorporate at least one appropriate health care ingredient. Example of healthcare ingredients include but not limit to antiacne agents, therapeutic active agents, external analgesics, —antibiotics, antiseptics, anti-inflammatory, astringents, hormones, smoking cessation compositions, cardiovascular, antiarrythmic, antipruritic agents and others.

The oil-phase of the emulsion composition herein may comprise component (a) is present in an amount of from 20 to 90 wt. % of the composition, alternatively from to 70 wt. % of the composition, alternatively 30 to 65 wt. %, alternatively 35 to 55 wt. % of the composition;

component (b) is present in an amount of from 15 to 70 wt. % of the composition, alternatively 30 to wt. %, alternatively 35 to 55 wt. % of the oil-phase of the emulsion composition;

component (c) is present in an amount of from 0.1 to 10 wt. %, alternatively from 0.5 to 8 wt. %, alternatively from 1 to 5 wt. % based on the total weight of the oil-phase of the emulsion composition; with the oil-phase of the emulsion composition being 98 to 5 wt. % of the emulsion composition, alternatively from 98 to 20 wt. % of the emulsion composition, alternatively from 98 to 55 wt. % of the emulsion composition, alternatively from 98 to 70% of the emulsion composition; and Component (d) is present in an amount of from 2 to 95 wt. %, alternatively from 2 to 80 wt. %, alternatively from 2 to 45 wt. % alternatively from 2 to 30 wt. % based on the total weight of the emulsion.

Typically, the additives are present in a cumulative total of about 10 wt. % of the emulsion composition, but this value may vary dependent on the end use of the emulsion composition. Any combination of the above may be utilised with the proviso that the total wt. % of the composition is always 100 wt. %.

As previously discussed there is provided herein a method for preparing an aqueous silicone emulsion composition comprising preparing a titanium-based reaction product (a) from a process comprising the steps of:

(i) mixing a first ingredient, an alkoxy titanium compound having from 2 to 4 alkoxy groups with a second ingredient, a linear or branched polydiorganosiloxane having at least two terminal silanol groups per molecule and a viscosity of from 30 to 300 000 mPa·s at 25° C.;

(ii) enabling the first and second ingredients to react together by stirring under vacuum to form a reaction product; and (iii) collecting the reaction product of step (ii);

mixing the following components with reaction product (a) to form an emulsion:

(b) one or more a silicon containing compounds having at least 2, alternatively at least 3 hydroxyl and/or hydrolysable groups per molecule;

(c) one or more surfactants;

(d) water.

Preferably the aqueous silicone emulsion composition yields an elastomer upon coalescence after the removal of water.

The emulsion may be prepared by any known method. The emulsion may be a one-part emulsion containing components (a) to (d), alternatively it may be provided in two parts:

(i) an emulsion J containing components (a), (c) and (d) but not component (b) and an emulsion K containing components (b), (c) and (d) but not component (a); or alternatively where (ii) emulsion J contains components (a), (c), (d) and part of the component (b); and emulsion K contains the rest of the component (b), (c) and (d).

When present in two parts, the two parts may be mixed in any suitable weight ratio prior to use.

In the case of a one-part emulsion, component (b) is mixed with component (a) and simultaneously or subsequently components (c) and admixing a sufficient amount of water (Component (d)) to form an emulsion. If deemed appropriate, further shear mixing of the emulsion and/or diluting of the emulsion with the component (d) may be undertaken. Any additional shear mixing is undertaken to reduce particle size and/or improve long term storage stability. In this embodiment, once the components are mixed together cure will commence but it works quicker than cure using standard titanium-based catalysts.

In the case of embodiment (i) when the emulsion composition is prepared in two parts, in emulsion J, component (a) is mixed with component (c) and admixed with a sufficient amount of water (component (d)) to form an emulsion. Again, if deemed appropriate, further shear mixing of the emulsion and/or diluting of the emulsion with the component (d) may be undertaken. Component (b) is separately mixed with components (c) and (d) in a similar fashion and emulsified to form emulsion K.

In the case of embodiment (ii) when the emulsion composition is prepared in two parts, a proportion of component (b) is mixed with component (a) and simultaneously or subsequently is mixed with component (c) admixed with a sufficient amount of water (component (d)) to form emulsion J. Again, if deemed appropriate, further shear mixing of the emulsion and/or diluting of the emulsion with the component (d) may be undertaken resulting in the formation of emulsion J. The remainder of component (b) is separately is mixed with component (c) admixed with a sufficient amount of water (component (d)) to form emulsion K. Again, if deemed appropriate, further shear mixing of the emulsion and/or diluting of the emulsion with the component (d) may be undertaken.

In both embodiments (i) and (ii) Subsequently the two emulsions J and K are mixed together in any suitable weight:weight ratio to form the emulsion composition as hereinbefore described. Likewise, emulsions J and K are subsequently mixed together in any suitable weight:weight ratio to form the emulsion composition as hereinbefore described.

In the embodiments (i) and (ii) where two emulsions are prepared and stored independently of each other, cure will only take place once the two emulsions are mixed and the water is evaporated or is allowed to evaporate. Optionally the two emulsions may be mixed by any suitable process such as, for the sake of example, drop coalescence.

The mixing in any of the above can be accomplished by any suitable process known in the art, for example, by means of a batch, semi-continuous, or continuous process. Mixing may occur, for example using, batch mixing equipment with medium/low shear include change-can mixers, double-planetary mixers, conical-screw mixers, ribbon blenders, double-arm or sigma-blade mixers; batch equipment with high-shear and high-speed dispersers include those made by Charles Ross & Sons (NY), Hockmeyer Equipment Corp. (NJ); batch equipment with high shear actions include Banbury-type (CW Brabender Instruments Inc., NJ) and Henschel type (Henschel mixers America, TX); centrifugal force-based, high shear mixing devices as for example Speed Mixer® (Hauschild & Co KG, Germany). Illustrative examples of continuous mixers/compounders include extruders single-screw, twin-screw, and multi-screw extruders, co-rotating extruders, such as those manufactured by Krupp Werner & Pfleiderer Corp (Ramsey, NJ), and Leistritz (NJ); twin-screw counter-rotating extruders, two-stage extruders, twin-rotor continuous mixers, dynamic or static mixers or combinations of this equipment.

Where required, any suitable techniques known in the art to provide high shear mixing to effect formation of emulsions may be utilised for example. Representative of such high shear mixing techniques include homogenizers, sonolators, and other similar shear devices.

The temperature and pressure at which mixing occurs is not critical, but generally is conducted at ambient temperature (20-25° C.) and pressures. Typically, the temperature of the mixture will increase during the mixing process due to the mechanical energy associated when shearing such high viscosity materials.

The emulsions of the present disclosure are oil in water emulsions. The present oil in water emulsions may be characterized by average volume particle of the dispersed (oil) phase in the continuous aqueous phase. The particle size may be determined by laser diffraction of the emulsion e.g., in accordance with ISO 13320:2009. Suitable laser diffraction techniques are well known in the art. The particle size is obtained from a particle size distribution (PSD). The PSD can be determined on a volume, surface, length basis. The volume particle size is equal to the diameter of the sphere that has the same volume as a given particle. The term Dv represents the average volume particle size of the dispersed particles. Dv 0.5 is the particle size measured in volume corresponding to 50% of the cumulative particle population. In other words, if Dv 0.5=10 μm, 50% of the particle have an average volume particle size below 10 μm and 50% of the particle have a volume average particle size above 10 μm. Unless indicated otherwise all average volume particle sizes are calculated using Dv 0.5.

The average volume particle size of the dispersed (oil) phase in the continuous aqueous phase of the emulsions may vary between 0.1 μm and 150 μm; or between 0.1 μm and 30 μm; or between 0.2 μm and 5.0 μm.

The product of the composition as hereinbefore described may be utilised for formulating sealants, adhesives, e.g., structural adhesives and pressure sensitive adhesives, coatings, cosmetics, cured articles for use in fabric care, personal care, beauty care, home care and/or health care, construction and automotive applications.

In one embodiment the emulsion composition herein yields an elastomer upon the removal of water. For the purpose of this invention the water-based silicone composition which affords a silicone elastomer upon the removal of water is deemed stable when storage of at least 4 weeks at does not alter neither the appearance nor the properties of the elastomer form upon the removal of water.

Benefits obtained from using a fabric care composition comprising the silicone-based material include one or more of the following benefits: fabric softening and/or feel enhancement (or conditioning), garment shape retention and/or recovery and/or elasticity, ease of ironing, colour care, anti-abrasion, anti-pilling, or any combination thereof.

The product described herein may be provided for use in cosmetic compositions. The cosmetic compositions may be in the form of a cream, a gel, a powder (free flowing powder or pressed), a paste, a solid, freely pourable liquid, an aerosol. The cosmetic compositions may be in the form of monophasic systems, biphasic or alternate multiphasic systems; emulsions, Skin care compositions include shower gels, soaps, hydrogels, creams, lotions and balms; antiperspirants; deodorants skin creams; skin care lotions-body and facial cleansers; pre-shave and after-shave lotions; shaving soaps; Skin care compositions exclude patches. Hair care compositions include shampoos, conditioners, Nail care compositions include color coats, base coats, nail hardeners, and kits thereof.

The product described herein may be provided for use in health care compositions or medicaments. Health care compositions may be in the form of ointments, creams, gels, mousses, pastes, spray on bandages, foams and/or aerosols or the like, medicament creams, pastes or sprays including anti-acne, dental hygienic, antibiotic, healing promotive, which may be preventative and/or therapeutic medicaments, and kits thereof. Health care compositions exclude patches.

Alternatively, cured silicones made from the compositions as hereinbefore described are vapour permeable and inert to the skin and can be formulated to provide adhesion to skin, thus making them candidates as adhesives for cosmetic patches, drug-release patches (for both humans and animals), wound dressings (for both humans and animals) and so on. It might be desirable that these compositions absorb the sweat or other body fluids.

EXAMPLES

All viscosity measurements were made using a Modular Compact Rheometer (MCR) 302 from Anton Paar GmbH of Graz, Austria using a 25 mm diameter rotational plate with a gap of 0.3 mm at a shear rate of 1 $s^{-1}$. All viscosities were measured at 25° C. unless otherwise indicated. The water used in the emulsification step herein was softened and demineralized.

The following ingredients were used in the Examples and are referred to using the short term in the Tables below:

Polymer 1: a substantially linear dimethylsilanol terminated polydimethylsiloxane having a viscosity ca. 803 mPa·s;

Polymer 4: a trimethoxysilyl terminated polydimethylsiloxane having a viscosity ca 63,000 mPa·s;

Polymer 3: a triethoxysilyl terminated polydimethylsiloxane having a viscosity ca 60,000 mPa·s;

TiPT: Tetra isopropoxy Titanium;

TtBT: Tetra t-butoxy Titanium;

Lutensol™ XP 79: is a non-ionic surfactant containing C10-Guerbet alcohol and an average of 7 ethylene-oxide (EO) groups per molecule and is commercially available from BASF; and Brij™ L3 and Brij™ L23 are non-ionic surfactants containing ethoxylated natural fatty alcohols, based on lauryl alcohol, having 3 and 23 ethylene-oxide groups on average respectively and are commercially available from CRODA.

Preparation of Titanium-Based Reaction Products

Three component (a) reaction products RP1, RP2 and RP3 were prepared for use in the examples. The ingredients used in their preparation are depicted in Table 1 below and the process followed in each case was otherwise identical and as such is exemplified below with the preparation of RP1.

TABLE 1

Ingredients for the three component (a) reaction products used in the Examples

| | Ingredient 1 | Amount present (g) | Ingredient 2 | Amount present (g) | weight ratio Ingredient 2/ Ingredient 1 |
|---|---|---|---|---|---|
| RP1 | TiPT | 0.801 | Polymer 1 | 199.997 | 250 |
| RP2 | TiPT | 0.600 | Polymer 1 | 199.990 | 333 |
| RP3 | TtBT | 1.290 | Polymer 1 | 199.961 | 155 |

Preparation of RP1

199.997 g of Polymer 1—was introduced into a plastic receptacle of a DAC 600 FVZ/VAC-P type SpeedMixer™ from Hauschild & Co. KG Germany. 0.801 g of TiPT was then added into the Polymer 1. A lid was placed on the receptacle and the initial weight of the ingredients, the receptacle and the lid were weighed together. Vacuum of about 160 mbar (16 kPa) was applied during mixing. The lid of the receptacle was pierced with 5 small holes to allow the volatile compounds to leave the mixture.

The ingredients were then mixed in a DAC 600 FVZ/VAC-P type SpeedMixer™ from Hauschild & Co. KG Germany for 6 periods of 4 minutes at 2350 rpm under vacuum.

After completion of the above mixing regime the receptacle, lid resulting reaction product, were re-weighed to determine weight loss due to the extraction of volatile alcohols. The weight loss was determined to be=0.662 g. The resulting loss of 0.662 g in weight accounted for approximately 97.9% of the alcohol content extractable as a by-product of the reaction between the first and second ingredients. The calculated Si—OH/Ti molar ratio was about 9.6:1, assuming a number average molecular weight of the polymer of about 14,800.

The viscosity of RP1 generated via the above process was then determined to be 18,000 mPa·s using a Modular Compact Rheometer (MCR) 302 from Anton Paar GmbH of Graz, Austria a diameter rotational plate with a gap of 0.3 mm at a shear rate of 1 $s^{-1}$. RP1 was then stored at room temperature in a glass bottle for a period of 28 days before the viscosity was re-measured using the same testing protocol is and was found to have remained pretty constant.

Two series of examples have been prepared, firstly using two-part emulsion compositions and secondly using one-part emulsion compositions.

Two-Part Emulsion Compositions

A series of two-part (K and J) emulsions were prepared. The type K emulsions contain components (b), (c) and (d)

but not component (a). The compositions of the prepared type K emulsions are depicted as Examples 1 to 6 (E1 to 6) in Table 2a. The type J emulsions contain components (a), (c) and (d) but not component (b). The composition of the prepared type J emulsions are depicted as Examples 7 to 10 (E7 to 10) in Table 2b.

The type K emulsions and type J emulsions were prepared using one of two alternative processes, process 1 or process 2 using a SpeedMixer™ DAC 150.1 FV from Hauschild & Co. KG Germany.

Process 1

Step 1: The respective component (a) or component (b) was introduced into the mixer and then the surfactant(s) was/were added and the combination was mixed for 35 sec at 3500 rpm to produce an oil phase.

Step 2. Water was introduced into the oil phase product of step 1 stepwise using portions no bigger than 3% wt. (calculated over the entire weight of emulsion). Each addition was followed by mixing for 35 sec at 3500 rpm and this was repeated until a silicone-in-water emulsion which was easily and completely dispersible in water was obtained.

Step 3. Dilution water was then added stepwise at portions of 5 to 15% wt. (calculated over the entire weight of emulsion) to the emulsion resulting from step 2 above. This was continued until a silicone-in-water emulsion of consisting of an oil phase which was 70-80 wt. % of the emulsion calculated over the entire weight of emulsion) was obtained.

Process 2

Step 1: The respective component (a) or component (b) was introduced into the mixer and then the surfactant(s) was/were added and the combination was mixed for 35 sec at 3500 rpm to produce an oil phase.

Step 2. Sufficient water to obtain silicone-in-water emulsion was added in one step, followed by mixing for 35 sec at 3500 rpm.

Step 3. Dilution water was then added stepwise at portions of 5 to. 15% wt. (calculated over the entire weight of emulsion) to the emulsion resulting from step 2 above. This was continued until a silicone-in-water emulsion of consisting of an oil phase which was 70-80 wt. % of the emulsion (calculated over the entire weight of emulsion) was obtained.

In both Tables 2a and 2b the highlighted "water" values in the examples below refer to the last amount of water added to in Step 2 regardless the process.

TABLE 2a

K type emulsion comprising component (b) but not component (a)

| | E1 | E2 | E3 | E4 | E5 | E6 |
|---|---|---|---|---|---|---|
| Emulsification process | 1 | 1 | 2 | 2 | 1 | 2 |
| Polymer 4 | 74.58% | 75.22% | | 75.97% | 76.05% | 75.95% |
| Polymer 3 | | | 76.38% | | | |
| Brij ™ L3 | | | 0.75% | 0.73% | 0.74% | 0.73% |
| Brij ™ L23 | | | 2.22% | 2.21% | 2.19% | 2.22% |
| Lutensol ™ XP 79 | 3.05% | 3.02% | | | | |
| water 1 | 1.53% | **2.55%** | **1.55%** | **1.50%** | 0.77% | **1.24%** |
| water 2 | **1.53%** | 8.90% | 9.68% | 9.33% | 0.44% | 9.69% |
| water 3 | 8.97% | 10.30% | 9.42% | 10.26% | **0.34%** | 10.17% |
| water 4 | 10.33% | | | | 9.18% | |
| water 5 | | | | | 10.30% | |
| TOTAL | 100.00% | 100.00% | 100.00% | 100.00% | 100.00% | 100.00% |

TABLE 2b

J type emulsion comprising component (a) but not component (b)

| | E7 | E8 | E9 | E10 |
|---|---|---|---|---|
| Emulsification process | 1 | 2 | 2 | 2 |
| RP1 | 76.46% | 75.86% | | |
| RP3 | | | 77.09% | 75.92% |
| Brij ™ L3 | 0.73% | 0.81% | 0.74% | 0.76% |
| Brij ™ L23 | 2.23% | 2.41% | 2.16% | 2.20% |
| water 1 | 2.77% | 4.74% | 5.48% | 3.88% |
| water 2 | 2.89% | 10.43% | 9.42% | 12.65% |
| water 3 | 9.61% | 5.75% | 5.11% | 4.56% |
| water 4 | 5.31% | | | |
| TOTAL | 100.00% | 100.00% | 100.00% | 100.00% |

Particle Size of the 2-Part Emulsions

Typical emulsion particle sizes for two K type emulsions from Table 2a, namely E5 and E6 and two J type emulsions from Table 2b, namely, E8 and E10 were determined using a Masterziser 3000 from Malvern Pananalytical Ltd of Malvern, U.K. Tests were made to determine $D_{10}$ (μm) and $D_{50}$ (μm). For the avoidance of doubt $D_{10}$ (μm) means 10% of the particles in the sample are smaller than the value given in μm and likewise $D_{50}$ (μm) (or $D_{0.5}$ as identified above) means 50% of the particles in the sample are smaller than the value given. Furthermore, compositions E6 and E8 were mixed to give a final composition and the particles sizes for the said mixtures were also assessed. The results are provided in Table 3 below.

TABLE 3

| Sample Name | $D_{10}$ (μm) | $D_{50}$ (μm) |
|---|---|---|
| E5 (type K) | 1.26 | 1.98 |
| E6 (type K) | 1.16 | 4.22 |
| E8 (type J) | 0.614 | 1.0 |
| E10 (type J) | 0.768 | 0.92 |
| mix - E8:E6 wt. ratio 1:1 | 0.674 | 1.42 |
| mix - E8:E6 wt. ratio 1:0.75 | 0.668 | 1.49 |
| mix - E8:E6 wt. ratio 1:0.4 | 0.688 | 1.63 |

This example shows that the obtained emulsions have a mean particle size (D50) within the range of 0.3-5 um.

Film Forming of Mixed Two-Part Emulsions

Four mixed emulsions were prepared, MIX 1 to MIX 4 as indicated in Table 4 below. In each MIX a type K and a type J emulsion were mixed together. A several hundred micron thick film was applied onto a polyethylene substrate and left to dry (i.e. to let water to evaporate away for a period of 4 hours and then for and 1 week and the haptic attributes of the film were assessed for tackiness. Tackiness was reviewed by touching the coating gently with the finger and comparing the coatings relative to each other. Uncured films produce long strings when touched with a finger or spatula. The cured films, regardless of level of tackiness, were self-standing. Provided the film was cured the tackiness of the film may be varied to meet the desired effect of the application for which it is to be used.

TABLE 4

Ability of two-part Emulsions to form a film layer & tackiness thereof

| | E3 (g) (type K) | E6 (g) (type K) | E8 (g) (type J) | Tackiness (4 h) | Tackiness (1 week) |
|---|---|---|---|---|---|
| MIX 1 | 15.071 | | 6.03 | Very Tacky | Not tacky |
| MIX 2 | 10.101 | | 10.0 | Very Tacky | Slightly tacky |
| MIX 3 | | 14.92 | 5.968 | Not cured | Tacky |
| MIX 4 | | 9.98 | 9.997 | Not cured | Tacky |

It will be appreciated that given the two-part nature of the Mixes 1 to 4 one can modify the ratio of Emulsion K to Emulsion J so that one can dial the cure time of the elastomer as well as the properties of the obtained film.

Stability of Two-Part Emulsions

Emulsion of Examples E3, E6, E8, were subjected to accelerated ageing via storage at 50° C. oven for 4 weeks. All samples remain readily dispersible, no coalescence or creaming were observed and as such both K type and J type emulsions remain stable with time and as such may be stored prior to mixing and forming the combined emulsion.

One-Part Emulsion Compositions

A series of one-part emulsions were also prepared using one of two alternative processes, process 1 or process 2 using a SpeedMixer™ DAC 150.1 FV from Hauschild & Co. KG Germany. The same processes 1 and 2 were utilised with a slightly difference in step 1. In step 1 in both processes the respective component (a) and component (b) was first introduced into the mixer and then mixed for 35 sec at 3500 rpm before the introduction of the surfactant(s). Otherwise, the same processes were utilised.

In both Tables 5a and 5b the highlighted "water" values in the examples below refer to the last amount of water added to in Step 2 regardless the process.

TABLE 5a

One-part Emulsion Compositions

| | E11 | E12 | E13 | E14 | E15 |
|---|---|---|---|---|---|
| Emulsification process | 1 | 2 | 2 | 2 | 2 |
| Polymer 4 | 23.27% | 23.23% | 39.70% | 23.68% | 22.25% |
| RP1 | 58.02% | 58.36% | 40.30% | | |
| RP2 | | | | 58.54% | 55.10% |
| Brij ™ L3 | 0.79% | 0.83% | 0.81% | 0.82% | 0.77% |
| Brij ™ L23 | 2.42% | 2.41% | 2.66% | 2.46% | 2.32% |
| water 1 | 1.67% | 4.66% | 3.59% | 3.67% | 2.85% |
| water 2 | 1.65% | 10.51% | 12.95% | 10.83% | 9.98% |
| water 3 | 1.63% | | | | 6.73% |
| water 4 | 10.54% | | | | |
| TOTAL | 100.00% | 100.00% | 100.00% | 100.00% | 100.00% |

TABLE 5b

One-part Emulsion compositions

| | E16 | E17 | E18 | E19 |
|---|---|---|---|---|
| Emulsification process | 2 | 2 | 2 | 2 |
| Polymer 4 | 55.26% | 43.89% | | |
| RP1 | 22.27% | 32.63% | 38.00% | 21.57% |
| Polymer 3 | | | 38.28% | 53.94% |
| Brij ™ L3 | 0.78% | 0.75% | 0.74% | 0.73% |
| Brij ™ L23 | 2.31% | 2.84% | 2.20% | 2.18% |
| water 1 | 2.31% | 1.89% | 2.26% | 2.72% |
| water 2 | 10.12% | 9.53% | 9.68% | 9.43% |
| water 3 | 6.95% | 8.48% | 8.83% | 9.44% |
| TOTAL | 100.00% | 100.00% | 100.00% | 100.00% |

Film Forming of One-Part Emulsion

A several hundred micron thick film of each of several one-part emulsions, E11, E12, E13, E18 and E19 was applied onto polyethylene substrates and left to enable water to evaporate away for a period of 4 hours. In each case after 4 hours (h), a self-sustaining elastic film of different tackiness was formed. Tackiness was assessed by the operator after 4 h and in some instances also after 1 week, recording the haptic attributes of each resulting film. Tackiness was determined by the same method as described above.

TABLE 6

Ability of one-part Emulsions to form a film layer & tackiness thereof

| | Tackiness (4 h) | Tackiness (1 week) |
|---|---|---|
| E11 | Very Tacky | Not measured |
| E12 | Very Tacky | Not measured |
| E13 | Slightly Tacky | Not measured |
| E18 | Slightly Tacky | Slightly Tacky |
| E19 | not tacky | not tacky |

The above results indicate that by modifying the amounts of the different components in the one-part emulsions herein ratio in Embodiment (1) one can tune the cure time of the elastomer as well as the properties of the obtained film.

Stability of One-Part Emulsions

Samples of two one-part emulsions E18 and E19 were subjected to accelerated ageing via storage at 50° C. oven for 4 weeks. All samples remain readily dispersible, no coalescence or creaming have been observed and as such it could be seen that the one-part emulsions herein also remain stable with time and as such may be stored prior to application.

COMPARATIVE EXAMPLE

Two comparative emulsions have been prepared.

Emulsion CE1 is a comparative J type emulsion for a two-part emulsion composition, i.e., an emulsion wherein component (a) was not pre-prepared but where ingredient 1 (titanate) and ingredient 2 (linear or branched polydiorganosiloxane having at least two terminal silanol groups per molecule) are introduced separately. In this case an analogous process to emulsion process 1 was used with the following differences:

(i) unreacted polymer 1 is introduced in step 1 of the process instead of component (a); and (ii) TiPT was added after the completion of Step 3, followed by mixing for 35 sec. at 3500 RPM.

Emulsion CE1 is intended to be a comparative for E8 above.

Emulsion CE2 is a one-part emulsion prepared in accordance with emulsion process 2 and is intended to be comparative with E19. The same changes as described above for process 1 were made for process 2 to prepare one-part emulsion CE2.

The compositions used for making the comparatives are provided in Table 7 below:

TABLE 7

Comparative J type emulsion (CE1) and one-part emulsion (CE2)

| | CE1 | CE2 |
|---|---|---|
| Polymer 1 | 75.62% | 21.52% |
| Polymer 3 | 0.00% | 53.95% |
| Brij ™ L3 | 0.76% | 0.75% |
| Brij ™ L23 | 2.28% | 2.21% |
| water 1 | 3.07% | 2.61% |
| water 2 | 1.21% | 9.45% |
| water 3 | 1.29% | 9.41% |
| water 4 | 1.36% | |
| water 5 | 1.24% | |
| water 6 | 1.28% | |
| water 7 | 1.82% | |
| water 8 | 9.78% | |
| TiPT -post-add | 0.29% | 0.10% |
| TOTAL | 100.00% | 100.00% |
| mass ratio Polymer/TiPT | 259 | 210 |

The two comparative emulsions prepared above were then tested to see if they provide films and to assess their tackiness. In each case a several hundred micron thick film of each of a two-part emulsion (E3 and CE1) and CE2 were applied onto polyethylene substrates and left to enable water to evaporate away for a period of 4 hours. In each case after 4 hours, neither comparative emulsion had cured unlike the emulsions as described in this disclosure which after 4 hours provided a self-sustaining elastic film of different tackiness. The results of the two-part emulsions are depicted in Table 8 and of the one-part emulsions are given in Table 9.

TABLE 8

Ability of two-part Emulsions (E3 + E8) and comparative (E3 + CE1) to form a film layer & tackiness thereof

| | E3 (g) | E8 (g) | CE1 (g) | Tackiness 4 h | Tackiness 1 week |
|---|---|---|---|---|---|
| MIX 1 (inventive) | 15.071 | 6.03 | | Very sticky | Not sticky |
| MIX 5 (non-inventive) | 15.081 | | 6.019 | Not cured | Not cured |

TABLE 9

Ability of one-part Emulsions E19 and comparative CE2 to form a film layer & tackiness thereof

| | Tackiness 4 h | Tackiness 1 week |
|---|---|---|
| E19 (inventive) | Not sticky | Not sticky |
| CE2 (non-inventive) | Not cured | Not cured |

It will be seen from Tables 8 and 9 that in both instances the comparative emulsions had not cured after 4 hours.

The invention claimed is:

1. An aqueous silicone emulsion composition comprising:

(a) a titanium-based reaction product obtained or obtainable from a process consisting essentially of the steps of:

(i) mixing a first ingredient, which is an alkoxy titanium compound having from 2 to 4 alkoxy groups, with a second ingredient, which is a linear or branched polydiorganosiloxane having at least two terminal silanol groups per molecule and a viscosity of from 30 to 300,000 mPa·s at 25° C., and optionally, with a third ingredient, which is a polydialkylsiloxane having one terminal silanol group per molecule;

(ii) enabling the first and second ingredients and, optionally, the third ingredient, to react together by stirring under vacuum to form a reaction product; and (iii) collecting the reaction product of step (ii);

(b) one or more silicon containing compounds having at least 2, optionally at least 3, hydroxyl and/or hydrolysable groups per molecule;

(c) one or more surfactants; and (d) water.

2. The aqueous silicone emulsion composition in accordance with claim 1, wherein the first ingredient is $Ti(OR)_4$, $Ti(OR)_3R^1$, $Ti(OR)_2R^1{}_2$ or a chelated alkoxy titanium molecule where there are two alkoxy (OR) groups present and a chelate bound twice to the titanium atom; where R is a linear or branched alkyl group having from 1 to 20 carbons and each $R^1$ may be the same or different and is selected from an alkyl group, an alkenyl group or an alkynyl group in each case having up to 10 carbons.

3. The aqueous silicone emulsion composition in accordance with claim 1, wherein the second ingredient is a dialkylsilanol terminated polydimethylsiloxane.

4. The aqueous silicone emulsion composition in accordance with claim 1, wherein the second ingredient has a viscosity of between 70 and 20,000 mPa·s at 25° C.

5. The aqueous silicone emulsion composition in accordance with claim 1, wherein component (b) is selected from silanes having at least 2 hydrolysable groups, optionally at least 3 hydrolysable groups, per molecule or an organopolysiloxane polymer having at least two hydroxyl or hydrolysable groups per molecule of the formula $$X_{3-n'}R^3_{n'}Si—(Z)_d(O)_q—(R^4_ySiO_{(4-y)/2})_z—(SiR^4_2—Z)_d—Si—R^3_{n'}X_{3-n'} \quad (7)$$

in which each X is independently a hydroxyl group or a hydrolysable group, each $R^3$ is an alkyl, alkenyl or aryl group, each $R^4$ is an X group, alkyl group, alkenyl group or aryl group and Z is a divalent organic group; d is 0 or 1, q is 0 or 1 and (d+q)=1; n' is 0, 1, 2 or 3, y is 0, 1 or 2, optionally y is 2, and z is an integer such that the organopolysiloxane polymer has a viscosity of from 50 to 150,000 mPa·s at 25° C.

6. The aqueous silicone emulsion composition in accordance with claim 1, wherein the composition also includes one or more additives selected from the group consisting of fillers, thickeners, preservatives and biocides, pH controlling agents, adhesion promoters, inorganic salts, dyes, perfumes, and mixtures thereof.

7. The aqueous silicone emulsion composition in accordance with claim 1, wherein the average volume particle size of a dispersed oil phase in a continuous aqueous phase of the emulsion is between 0.1 μm and 150 μm.

8. The aqueous silicone emulsion composition in accordance with claim 1, wherein component (b) is titanium free.

9. The aqueous silicone emulsion composition in accordance with claim 1, which is a one-part emulsion containing components (a) to (d), or is a two-part emulsion comprising:
(i) an emulsion J containing components (a), (c) and (d) but not component (b); and
an emulsion K containing components (b), (c) and (d) but not component (a); or
(ii) an emulsion J containing components (a), (c), (d) and part of component (b); and
an emulsion K containing (c), (d), and the rest of component (b).

10. A method for preparing an aqueous silicone emulsion composition, said method comprising:
preparing a titanium-based reaction product (a) from a process consisting essentially of the steps of:
(i) mixing a first ingredient, which is an alkoxy titanium compound having from 2 to 4 alkoxy groups, with a second ingredient, which is a linear or branched polydiorganosiloxane having at least two terminal silanol groups per molecule and a viscosity of from 30 to 300,000 mPa·s at 25° C., and optionally, with a third ingredient, which is a polydialkylsiloxane having one terminal silanol group per molecule;
(ii) enabling the first and second ingredients and, optionally, the third ingredient to react together by stirring under vacuum to form a reaction product; and
(iii) collecting the reaction product of step (ii); and
mixing the following components with the titanium-based reaction product (a) to form an emulsion:
(b) one or more silicon containing compounds having at least 2, optionally at least 3, hydroxyl and/or hydrolysable groups per molecule;
(c) one or more surfactants; and
(d) water.

11. The method for preparing an aqueous silicone emulsion composition in accordance with claim 10, wherein the first ingredient is $Ti(OR)_4$, $Ti(OR)_3R^1$, $Ti(OR)_2R^1_2$ or a chelated alkoxy titanium molecule where there are two alkoxy (OR) groups present and a chelate bound twice to the titanium atom; where R is a linear or branched alkyl group having from 1 to 20 carbons and each $R^1$ may be the same or different and is selected from an alkyl group, an alkenyl group or an alkynyl group in each case having up to 10 carbons.

12. The method for preparing an aqueous silicone emulsion composition in accordance with claim 10, wherein the second ingredient is a dialkylsilanol terminated polydimethylsiloxane.

13. The method for preparing an aqueous silicone emulsion composition in accordance with claim 10, wherein the second ingredient has a viscosity of between 70 and 20,000 mPa·s at 25° C.

14. The method for preparing an aqueous silicone emulsion composition in accordance with claim 10, wherein component (b) is selected from silanes having at least 2 hydrolysable groups, optionally at least 3 hydrolysable groups, per molecule or an organopolysiloxane polymer having at least two hydroxyl or hydrolysable groups per molecule of the formula $$X_{3-n'}R^3_{n'}Si—(Z)_d(O)_q—(R^4_ySiO_{(4-y)/2})_z—(SiR^4_2—Z)_d—Si—R^3_{n'}X_{3-n'} \quad (7)$$

in which each X is independently a hydroxyl group or a hydrolysable group, each $R^3$ is an alkyl, alkenyl or aryl group, each $R^4$ is an X group, alkyl group, alkenyl group or aryl group and Z is a divalent organic group; d is 0 or 1, q is 0 or 1 and (d+q)=1; n' is 0, 1, 2 or 3, y is 0, 1 or 2, optionally y is 2, and z is an integer such that the organopolysiloxane polymer has a viscosity of from 50 to 150,000 mPa·s at 25° C.

15. The method for preparing an aqueous silicone emulsion composition in accordance with claim 10, wherein component (b) is titanium free.

16. The method for preparing an aqueous silicone emulsion composition in accordance with claim 10, wherein the aqueous silicone emulsion composition is prepared in two parts:
an emulsion J, by mixing component (a) with component (c) and admixed with a sufficient amount of component (d) to form an emulsion; optionally, further shear mixing of the emulsion and/or diluting of the emulsion with component (d); and component (b) is separately mixed with components (c) and (d) and emulsified to form an emulsion K; or
part of component (b) is mixed with component (a) and simultaneously or subsequently is mixed with component (c) admixed with a sufficient amount of component (d) to form an emulsion J; optionally, further shear mixing of the emulsion and/or diluting of the emulsion with component (d); and the remainder of component (b) is separately mixed with component (c) admixed with a sufficient amount of component (d) to form an emulsion K; optionally, further shear mixing of the emulsion and/or diluting of the emulsion with component (d).

17. The method for preparing an aqueous silicone emulsion composition in accordance with claim 16, wherein subsequently the two emulsions J and K are mixed together in any suitable weight to weight ratio to form the aqueous silicone emulsion composition.

18. An elastomer, which is a product from the aqueous silicone emulsion composition in accordance with claim 1 upon the removal of water.

* * * * *